(12) United States Patent
Vincent

(10) Patent No.: US 12,619,741 B1
(45) Date of Patent: May 5, 2026

(54) SYSTEMS AND METHODS FOR AGENTIC POLICY ENFORCEMENT

(71) Applicant: Bricklayer AI Inc., Arlington, VA (US)

(72) Inventor: Adam Vincent, McLean, VA (US)

(73) Assignee: Bricklayer AI Inc., Arlington, VA (US)

( * ) Notice: Subject to any disclaimer, the term of this patent is extended or adjusted under 35 U.S.C. 154(b) by 0 days.

(21) Appl. No.: 19/418,156

(22) Filed: Dec. 12, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ........................ G06F 21/577; G06F 2221/034
See application file for complete search history.

(56) References Cited

U.S. PATENT DOCUMENTS

| | | | |
|---|---|---|---|
| 10,958,653 B1 | 3/2021 | Miller et al. | |
| 11,102,189 B2 | 8/2021 | O'Neill et al. | |
| 11,616,782 B2 | 3/2023 | Ojha et al. | |
| 12,316,655 B1 | 5/2025 | Thompson et al. | |
| 12,316,753 B1 | 5/2025 | Dahme et al. | |
| 12,556,548 B1 * | 2/2026 | Vanninen | H04L 63/1408 |
| 2021/0273958 A1 * | 9/2021 | McLean | H04L 63/1433 |
| 2024/0414204 A1 * | 12/2024 | Rund | H04L 63/1433 |
| 2025/0039135 A1 | 1/2025 | Parla et al. | |
| 2025/0039239 A1 | 1/2025 | Parla et al. | |
| 2025/0047698 A1 * | 2/2025 | Rund | H04L 63/1425 |
| 2025/0225213 A1 | 7/2025 | Dogra et al. | |
| 2025/0377904 A1 * | 12/2025 | Fedoruk | G06F 21/6209 |
| 2025/0378001 A1 * | 12/2025 | Fedoruk | G06F 21/6209 |
| 2026/0030476 A1 * | 1/2026 | Chandrasekaran | G06N 3/004 |
| 2026/0030514 A1 * | 1/2026 | Jenkins | G06N 3/006 |
| 2026/0037737 A1 * | 2/2026 | O'Neill | G06F 16/33295 |
| 2026/0044392 A1 * | 2/2026 | Zhang | G06F 9/54 |
| 2026/0044610 A1 * | 2/2026 | Rajaretnam | G06F 21/577 |

FOREIGN PATENT DOCUMENTS

IN          202521068253 A  * 10/2025  ........... G06F 21/577

* cited by examiner

*Primary Examiner* — Stephen T Gundry
(74) *Attorney, Agent, or Firm* — Neo IP

(57) ABSTRACT

Systems and methods for policy enforcement within an artificial intelligence (AI) agentic workflow. Each action within the AI agentic workflow is intercepted by a run-time enforcement engine. Utilizing security labels for each component within the AI agentic workflow, the run-time enforcement engine cross-references the security labels against a policy to ensure an action taken by a component within the AI agentic workflow is authorized under the policy.

20 Claims, 3 Drawing Sheets

SYSTEMS AND METHODS FOR AGENTIC POLICY ENFORCEMENT

BACKGROUND OF THE INVENTION

1. Field of the Invention

The present invention relates to policy enforcement for artificial intelligence (AI) agent systems and, more specifically, label-based runtime policy enforcement for AI agentic systems.

2. Description of the Prior Art

It is generally known in the prior art to utilize role-based access control (RBAC) or hardcoded permission checks.

Prior art patent documents include the following:

U.S. Pat. No. 12,316,655 for cyber resilience agentic mesh by inventors Jonathan J. Thompson et al., filed Jan. 30, 2025, and issued May 27, 2025, is directed to systems, methods, and computer-readable media for autonomous agents. The autonomous agent can include one or more processing circuits configured to receive or identify a dynamic data structure comprising one or more functions or one or more frameworks for performing a plurality of cyber resilience operations. The processing circuits can register the autonomous agent with a decentralized network, centralized network, or data source (DNCNDS). The processing circuits can receive or identify, from at least one computing system external or internal to the DNCNDS, cyber resilience data. The processing circuits can perform, in real-time, the at least one cyber resilience operation of the plurality of cyber resilience operations based at least on selecting at least one function of the one or more functions of the dynamic data structure based at least on the cyber resilience data.

US Patent Pub. No. 2025/0225213 for a system and method for policy enhancement by inventors Tushar Dogra et al., filed Sep. 14, 2023, and published Jul. 10, 2025, is directed to determining whether candidate digital components violate a policy and using the determination to propagate policy labels. Candidate digital components may be filtered such that only a subset of the candidate digital components is provided to a machine learning model for further policy review. The machine learning model may provide a confidence score associated with the policy violation prediction. The policy violation prediction may be "violates policy" or "does not violate policy." A label corresponding to the policy violation prediction may be associated with the digital component. The confidence score may be used when determining whether to use the policy violation prediction to propagate labels to other digital components. The labels may be propagated using a seed based enforcement system or a neighborhood based propagation system.

U.S. Pat. No. 11,616,782 for context-aware content object security by inventors Alok Ojha et al., filed Oct. 1, 2020, and issued Mar. 28, 2023, is directed to a global permissions model. The global permissions model serves for applying a first set of resource access permissions to shared content objects. Additionally, a set of context-aware access policies that govern user interactions over the shared content object is established. When a particular user requests an interaction over a shared content object, then interaction attributes associated with the request are gathered. The context-aware access policies are applied to the request by determining a set of extensible access permissions that are derived from the interaction attributes. The context-aware access policies are enforced by overriding the first set of resource access permissions with dynamically-determined access permissions. When a particular access request is denied, a response is generated in accordance with the set of extensible access permissions and the user is notified. In some cases, the access request is permitted, but only after the user provides a justification.

U.S. Pat. No. 11,102,189 for techniques for delegation of access privileges by inventors Kevin Ross O'Neill et al., filed Jun. 26, 2014, and issued Aug. 24, 2021, is directed to systems and methods for controlling access to one or more computing resources relate to generating session credentials that can be used to access the one or more computing resources. Access to the computing resources may be governed by a set of policies and requests for access made using the session credentials may be fulfilled depending on whether they are allowed by the set of policies. The session credentials themselves may include metadata that may be used in determining whether to fulfill requests to access the one or more computing resources. The metadata may include permissions for a user of the session credential, claims related to one or more users, and other information.

U.S. Pat. No. 10,958,653 for dynamically adaptive computer security permissions by inventors Kevin Christopher Miller et al., filed Jun. 27, 2017, and issued Mar. 23, 2021, is directed to a computing resource service provider granting a first set of security permissions to a principal (e.g., a user) which may be used to access a plurality of computing resources. The permissions may be associated with a first security token. The principal may access resources using the first set of security permissions, and a system (e.g., a service provider) may identify a subset of security permissions that are sufficient to provide access to the computing resources accessed by the principal using the first set of permissions. The subset may be associated with the principal. In some cases, the principal operating under the subset of permissions may be denied access to a computing resource and may be granted access to the computing resource by operating under the first set of permissions.

U.S. Pat. No. 12,316,753 for a secure multi-agent system for privacy-preserving distributed computation by inventors Harrison Dahme et al., filed Feb. 3, 2025, and issued May 27, 2025, is directed to a system for secure compute using artificial intelligence agents. The system includes a hardware execution environment with one or more computerized processors and electronic storage media. The processors are configured to establish a secure agent comprising a secure state management module, an encrypted state transition management module, a threshold cryptography implementation, and a digital signature verification module. The system also includes a plurality of atomic agents, each configured to perform a composite task and comprising a task-specific execution module, a state management interface, and a communication module. An orchestrator agent coordinates secure execution of the atomic agents and includes a task distribution module, a result aggregation module, a workflow management module, and a security policy enforcement module. The orchestrator agent integrates encrypted outputs from the atomic agents to perform composite tasks while maintaining data integrity and security through the secure state management module.

US Patent Pub. No. 2025/0039239 for adaptive policy generation in distributed security fabrics by inventors Vincent Parla et al., filed Jun. 24, 2024, and published Jan. 30, 2025, is directed to a system and method for placing security operations at selected enforcement points in a distributed security fabric. The enforcement points at which the security operations are placed can be endpoints, nodes, and/or network devices within the network. The security operations can be updated by monitoring data flows through the network to generate network data, and then determining, based on the network data, one or more changes to the security operations, based on the generated network data. Recommended changes can be obtained by applying the network data to a machine-learning model that indicates suspicious data packets (e.g., disseminates packets suspected of being malicious from normal traffic) and crafts new policies to deny the suspicious data packets. Performance of the network can also be improved by analyzing the security operations for redundancies and/or inefficiencies and modifying the security operations to mitigate them.

US Patent Pub. No. 2025/0039135 for determining security actions at policy-enforcement points using metadata representing a security chain for a data flow by inventors Vincent Parla et al., filed Jul. 22, 2024, and published Jan. 30, 2025, is directed to a system and method that use metadata encoded in a data flow to determine security actions to perform at a policy-enforcement point based on the security-chain context for the data flow that is provided by metadata (e.g., the security-chain context can include which security operations have been performed upstream on which data packets). The policy-enforcement point receives the data flow and the metadata, including attestations of the security operations that have previously (e.g., upstream) been applied to the data flow. Based on the attested to security operations, the policy-enforcement point selects what security actions to apply next to the data flow, e.g., additional security operations to apply, allow the data flow into a workload or trust zone, drop the workload, perform dynamic load balancing.

SUMMARY OF THE INVENTION

The present invention relates to policy enforcement for artificial intelligence (AI) agent systems and, more specifically, label-based runtime policy enforcement for AI agentic systems.

It is an object of this invention to provide label-based runtime policy enforcement for AI agentic systems.

In one embodiment, the present invention is directed to a method for enforcing policy controls in an AI agent workflow, including providing a computer processor including a memory, providing at least one security label for components of the AI agent workflow, wherein the components of the AI agent workflow include at least one AI agent, at least one tool, at least one data source, and at least one memory, intercepting via a run-time enforcement engine a request by a requesting component of the AI agent workflow to perform an action on a target component, retrieving a security label associated with the requesting component and a security label associated with the target component, matching the security label associated with the requesting component against a set of predefined policy rules, wherein each rule of the set of predefined policy rules specifies permitted or restricted actions based on security label attributes, evaluating a contextual condition associated with the requesting component, determining, based on the set of predefined policy rules and the evaluated contextual condition, whether to allow, deny, or conditionally permit the request, and executing, blocking, or auditing the action based on the determination.

In another embodiment, the present invention is directed to a method for enforcing policy controls in an AI agent workflow, including providing a computer processor including a memory, including a procedure within the AI agent workflow, providing a plurality of components within the AI agent workflow, assigning a procedure-level security label to a composite task within the AI agent workflow, wherein the plurality of components of the AI agent workflow includes at least one AI agent, at least one tool, at least one data source, and at least one memory, wherein the composite task includes at least one sub-task, propagating the procedure-level security label to the at least one sub-task within the procedure executed by one of the plurality of components within the AI agent workflow, enforcing at least one policy authorization by a run-time enforcement engine execution of the at least one sub-task under the propagated procedure-level security label, maintaining an association between each of the at least one sub-task and the one of the plurality of components calling the at least one sub-task, and auditing the at least one sub-task executed by the one of the plurality of components within the AI agent workflow under the propagated procedure-level security label.

In yet another embodiment, the present invention is directed to a system for enforcing policy controls in an AI agent workflow, including at least one computer processor including a memory, a plurality of AI agents each configured to perform tasks and/or sub-tasks in a collaborative workflow, a security label registry associating security labels with components within the AI agent workflow, a policy engine operable to store and match policy rules based on the security labels, a run-time enforcement engine operable to intercept an attempted action, resolve security labels associated with requesting components and security labels associated with target components, evaluate the policy rules and contextual conditions, and return a decision to allow, deny, or audit allowed actions, wherein the components within the AI agent workflow include the plurality of AI agents, at least one tool, at least one memory, and at least one data source, and wherein the at least one memory is operable to store the tasks and/or sub-tasks, results for completed tasks and/or sub-tasks, and a shared memory state.

These and other aspects of the present invention will become apparent to those skilled in the art after a reading of the following description of the preferred embodiment when considered with the drawings, as they support the claimed invention.

DETAILED DESCRIPTION

Figure 1A:
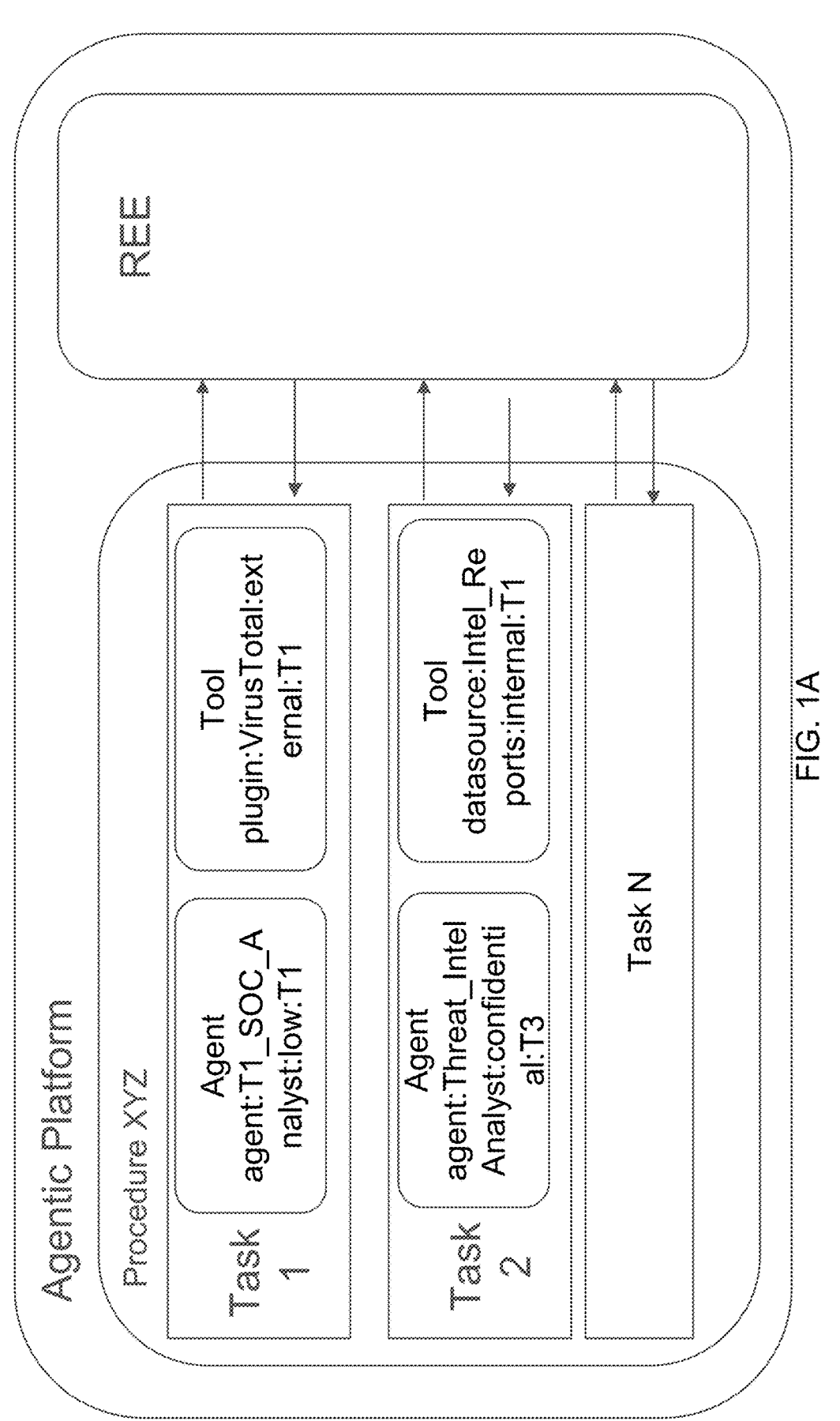
FIG. 1A is a schematic diagram of a runtime enforcement engine coordinating with an AI agentic platform according to one embodiment of the present invention.

The present invention generally relates to policy enforcement for artificial intelligence (AI) agent systems and, more specifically, label-based runtime policy enforcement for AI agentic systems.

In one embodiment, the present invention is directed to a method for enforcing policy controls in an AI agent workflow, including providing a computer processor including a memory, providing at least one security label for components of the AI agent workflow, wherein the components of the AI agent workflow include at least one AI agent, at least one tool, at least one data source, and at least one memory, intercepting via a run-time enforcement engine a request by a requesting component of the AI agent workflow to perform an action on a target component, retrieving a security label associated with the requesting component and a security label associated with the target component, matching the security label associated with the requesting component against a set of predefined policy rules, wherein each rule of the set of predefined policy rules specifies permitted or restricted actions based on security label attributes, evaluating a contextual condition associated with the requesting component, determining, based on the set of predefined policy rules and the evaluated contextual condition, whether to allow, deny, or conditionally permit the request, and executing, blocking, or auditing the action based on the determination.

In another embodiment, the present invention is directed to a method for enforcing policy controls in an AI agent workflow, including providing a computer processor including a memory, including a procedure within the AI agent workflow, providing a plurality of components within the AI agent workflow, assigning a procedure-level security label to a composite task within the AI agent workflow, wherein the plurality of components of the AI agent workflow includes at least one AI agent, at least one tool, at least one data source, and at least one memory, wherein the composite task includes at least one sub-task, propagating the procedure-level security label to the at least one sub-task within the procedure executed by one of the plurality of components within the AI agent workflow, enforcing at least one policy authorization by a run-time enforcement engine execution of the at least one sub-task under the propagated procedure-level security label, maintaining an association between each of the at least one sub-task and the one of the plurality of components calling the at least one sub-task, and auditing the at least one sub-task executed by the one of the plurality of components within the AI agent workflow under the propagated procedure-level security label.

In yet another embodiment, the present invention is directed to a system for enforcing policy controls in an AI agent workflow, including at least one computer processor including a memory, a plurality of AI agents each configured to perform tasks and/or sub-tasks in a collaborative workflow, a security label registry associating security labels with components within the AI agent workflow, a policy engine operable to store and match policy rules based on the security labels, a run-time enforcement engine operable to intercept an attempted action, resolve security labels associated with requesting components and security labels associated with target components, evaluate the policy rules and contextual conditions, and return a decision to allow, deny, or audit allowed actions, wherein the components within the AI agent workflow include the plurality of AI agents, at least one tool, at least one memory, and at least one data source, and wherein the at least one memory is operable to store the tasks and/or sub-tasks, results for completed tasks and/or sub-tasks, and a shared memory state.

None of the prior art discloses policy enforcement for AI agentic systems using a label-based runtime enforcement engine.

Modern computing operations and, more specifically, cybersecurity operations are increasingly augmented or automated through autonomous AI agents. For example, cybersecurity operations are often automated through AI agents designed to execute specific tasks, such as alert triage, threat intelligence gathering, vulnerability analysis, and incident response. Problematically, the evolution of AI agentic systems has introduced challenges around coordination of the AI agents, governance of autonomous operations, and data access management. Traditional systems are able to manage software logic and data flow because the traditional systems are static and controlled by human operators. However, the more control the human operators have in the traditional systems, the less efficiently the systems operate, and human control introduces inherent human error into the systems. Agentic AI systems are operable to automate a majority of tasks previously performed by humans in traditional systems because agentic AI systems operate with high degrees of autonomy, concurrency, and procedural fluidity. Therefore, there exists an unmet need for a computing system that includes the efficiency of agentic AI with a level of control present in human-operated systems, without including human error.

For cybersecurity operations specifically, a critical risk in agentic AI systems is uncontrolled interaction between AI agents and organizational boundaries. For example, AI agents inadvertently accessing data, invoking improper tools, or communicating with users and/or other AI agents within the system in ways that violate organizational security policies, data sensitivity constraints, and/or operational boundaries. In cybersecurity AI agentic systems, uncontrolled interactions are prevalent in security operations centers (SOCs), where AI agents interact with sensitive internal (i.e., specific to a particular customer) logs, external intelligence feeds, compliance systems, and customer-specific environments. Prior art systems attempt to address uncontrolled interactions via role-based access control (RBAC) or hardcoded permissions checks. However, the prior art systems are insufficient in dynamic, AI agentic environments. The prior art systems lack the granularity, contextual awareness, and propagation logic needed to manage how AI agent identification, task delegation, and procedural context influence what actions a component within an AI agentic system is able to perform, and on what data and/or systems the component within the AI agentic system is able to operate on. Therefore, there is an unmet need for a label-based runtime enforcement system that is operable to assign security labels to components within an AI agentic system, such as AI agents, data, tools, and procedures, dynamically evaluate whether a requested action is permitted based on organizational policy rules and live context, propagate the security labels across multi-AI agent workflows to maintain organizational boundaries throughout the duration of a task, and log, audit, and enforce organizational policy decisions at runtime (i.e., during task execution). The systems and methods of the present invention are operable to include flexible, policy-driven AI agentic architecture to govern interactions between components (i.e., AI agents) and their environments using structured security labels.

Importantly, organizational policy enforcement is critical for platform designers and organizational management. The systems and methods of the present invention include security labels for each component within an AI agent system that enable decisions such as what types of AI agents are able to access or modify certain data, what tools and/or plugins an AI agent is able to invoke, whether memory is able to be read/written across AI agents, and/or how security label combinations influence workflow control.

Advantageously, label-based security utilizing a runtime enforcement engine improves computer functionality for AI agentic systems by limiting unauthorized access to data without sacrificing the computational autonomy of an AI agentic system.

The systems and methods of the present invention include at least one computer processor including a memory, at least one AI agent, at least one security label, and a runtime enforcement engine operable to automatically enforce at least one policy. Generally, the systems and methods of the present invention operate within an AI agent system, wherein the AI agent system includes at least one AI agent, at least one plug-in, at least one tool, and/or at least one data source.

The systems and methods of the present invention are operable to run on at least one computer processor including a memory, a server computer, an edge computing device, and/or a cloud computing device. The systems and methods are operable to be executed by the at least one computer processor including a memory, a server computer, an edge computing device, and/or a cloud computing device. However, AI agents are operable to exist on the at least one computer processor including a memory, the server computer, the edge computing device, a cloud computing device, and/or the internet. Therefore, the systems and methods are operable to communicate with a network of components within an AI agentic system (i.e., AI agents, tools, plugins, etc.) saved on the memory of the computer processor and/or communicate with a network of components hosted on the internet. In one embodiment, AI agents are operable to be embedded in API calls such that the systems and methods of the present invention are operable to call an API where the component exists.

The systems and methods of the present invention are operable to ensure automatic policy enforcement without sacrificing the computational efficiency of AI agentic systems via an agentic policy enforcement system. Advantageously, the agentic policy enforcement system is operable to be added into existing AI agentic systems or be utilized as a unique architecture for an AI agentic system.

The agentic policy enforcement system utilizes a runtime enforcement engine (REE) to evaluate interactions between AI agents, tools, memory structures, data sources, external plugins, and/or any other components within an AI agentic system. The agentic policy enforcement system includes assigning structured security labels to every component within an AI agentic system. The structured security labels include attributes of the component, such as identity, role, data sensitivity, and execution clearance level.

Further, the agentic policy enforcement system is operable to support domain-specific policy language (DSL) (i.e., organizational-specific policy language). Using DSL enables an administrator to specify what actions within the domain/organization are permitted, restricted, and/or audited for various components of an AI agentic system. For example, in one embodiment, a runtime enforcement engine is operable to intercept and evaluate an AI agent attempting to read memory, invoke a plugin, and/or delegate a task against the DSL in real time to ensure the action of the AI agent complies with organizational standards.

To ensure security and operational integrity across AI agentic workflows (i.e., distributed workflows), the agentic policy enforcement system includes label propagation and/or inheritance between components within an AI agentic system. For example, in one embodiment, when a task is delegated or escalated from one AI agent to another AI agent, or a task is executed across multiple AI agents, the agentic policy enforcement system preserves and/or appropriately transforms relevant security labels to enforce consistent policy boundaries. To specify further, in one embodiment, an alert investigation initiated by a low-security clearance AI agent in a cybersecurity system will maintain the low-security clearance throughout the process of delegating the task to a higher-security clearance AI agent and execution of the task by the higher-security clearance AI agent.

In one embodiment, the agentic policy enforcement system operates on an existing AI agentic platform. In another embodiment, the agentic policy enforcement system is included as part of a uniquely created AI agentic platform designed to coordinate with an REE of the agentic policy enforcement system. However, in both embodiments, the agentic policy enforcement system includes at least one security label and at least one policy.

The at least one security label includes an identity, a role, data sensitivity, and an execution clearance level. For example, each component within an AI agentic platform is assigned the at least one security label, wherein an REE intercepts any requested action and analyzes the at least one security label to enforce whether the component is able to take the requested action. The identity includes a unique identifier specific to the component the identity applies to. For example, an AI agent identity includes an AI agent identification number and/or name, a memory component includes a memory block identification number and/or name, and a tool includes a plugin name. The role includes an operational role specific to the component the role applies to. For example, an AI agent role includes a tag, such as "T1_Investigator," "IR_Agent," or "Threat_Intel," a memory component includes a tag, such as "core knowledge," "human resources policies," or "cybersecurity threat process," and a tool includes a tag, such as "investigation use," "threat reporting," or "database access." The data sensitivity includes a classification of data the component is operable to access, such as "low," "confidential," or "restricted." The execution clearance level includes a trust boundary of the component, such as "T1," "T2," or "T3." In one embodiment, T3 includes more privileges than T1. The data sensitivity involves which data a component of the AI agent system has access to, whereas execution level is a level of authority the component within the AI agent system has to perform a function. For example, an AI agent may have access to confidential data (i.e., data sensitivity) but cannot generate (i.e., execution level) a report based on that data and therefore must delegate the task to another AI agent within the agentic policy enforcement system. Therefore, the at least one security label generally takes the form of a string of alphanumeric characters. An example is included below:
[identity]:[function_role]:[data_sensitivity]:[execution_level].

The at least one security label is used to enforce at least one policy. In one embodiment, the agentic policy enforcement system includes a DSL for administrators to define allowed and denied interactions between components of an AI agentic system. The DSL generally supports allowing an action, denying an action, or allowing an action with auditing. In one embodiment, the DSL is a natural language document, wherein the agentic policy enforcement system is operable to determine the at least one policy from the DSL using natural language processing. In one embodiment, supported actions for the DSL include a component of an AI agentic system reading, writing, querying, invoking, delegating, and/or escalating. As such, the at least one policy includes a rule that an REE must enforce when comparing security labels between components during execution of a task and/or sub-task. In one embodiment, the agentic policy enforcement system receives user input as to which AI agent completes the task and/or sub-task. In this embodiment, the AI agent will not complete a task and/or sub-task if the AI agent is not authorized to do so under its own security label, regardless of whether the user is authorized. The AI agent will fail to complete the task and begin auditing. In one embodiment, the DSL includes context to allow, deny, or allow with auditing based in part on context such as time, assigned case ID, team ownership, and/or task and/or sub-task lineage. In one embodiment, the REE allowing an action with auditing automatically flags the action and determines whether the action should be logged, ignored, or trigger an alert. Therefore, the DSL generally takes the following form as a string of alphanumeric characters:

ALLOW:     [subject_type]:[role_match]:[sensitivity_ match]:[level_match]
        TO: [action]
            [object_type]:[role_match]:[sensitivity_match]:[lev- el_match]
        IF: [conditions]
        WITH: [audit_flag]
    An example DSL policy is included below:
    DENY: [Agent]:[Investigator]:[low]:[T1]
        TO: [read]
            [data_source]:[Investigator]:[low]:[T1]
        IF: [5:01 PM-8:59 AM]

An REE is operable to analyze at least one security label to enforce at least one policy at the time of task execution. In one embodiment, the subject is the component within the AI agent system attempting to perform an action, the component utilizing the at least one security label, wherein the object is the component within the AI agent system on which the action is being performed. In one embodiment, and as a nonlimiting example, an AI agent includes the security label [Agent]:[Investigator]:[low]:[T1], and a data source includes a security label to determine which components are able to access the data source, wherein the security label includes [data_source]:[Investigator]:[low]:[T1]. Therefore, the REE will compare the security label of the AI agent against the security label of the data source to determine if the labels match. In this example, the AI agent is the subject type, and the data source is the object. To illustrate further, the REE analyzes if a condition is present. In this manner, the REE is operable to block an action, even if the security labels match, but the condition is not met. For example, the AI agent is only operable to access the data source during 9:00 AM-5:00 PM, but the AI agent is attempting to access the data source at 7:00 PM. Therefore, if the REE denies the AI agent.

The REE intercepts all sensitive operations and is operable to intercept requests, conduct label resolution, match policies, evaluate a condition, enforce a decision, and/or log actions. In one embodiment, intercepting requests includes the REE receiving an application programming interface (API) call when an AI agent initiates an action. In another embodiment, the REE is coded into a software program as a call function such that the REE is not called utilizing an API. The API call includes details of the subject, object, and/or intended operation. Advantageously, the REE is operable to intercept all actions for an AI agent system. In one embodiment, conducting label resolution includes the REE retrieving the at least one security label for the subject (i.e., an AI agent) and the object (i.e., the memory block the AI agent is trying to access). In one embodiment, the subject is the component within the AI agent system attempting to perform an action that utilizes the at least one security label, wherein the object is the component within the AI agent system on which the action is being performed. For example, an AI agent (subject) attempts to read (action) a data source (object). In this example, a security label for the subject is cross-referenced against at least one policy, wherein the REE determines if the subject is authorized to read the data source based on the security label for the subject, the at least one policy, and the security label for the data source.

The REE is operable to then match policies, such as comparing the at least one security label for the subject to the at least one security label for the object and determining if the security labels match. The matching policies function includes the REE comparing the at least one security label to active policies within an organization by using artificial intelligence and/or machine learning (ML) using pattern recognition and/or wildcards.

The REE evaluating conditions includes the REE matching any policies including an "IF" clause in real-time to determine if a condition for enabling an action based on the policy is met based in part on execution context.

The REE enforcing decision includes the REE enforcing decisions based on the condition evaluation. Depending on the output of the condition evaluation, the REE returns a response including allow, deny, allow with audit, and/or allow with override token. The REE logging an action includes the REE logging all actions with a timestamp, subject, object, action, and decision rationale.

The agentic policy enforcement system is operable to include label propagation and inheritance properties. For example, when an AI agent executes a workflow utilizing at least one security label, the agentic policy enforcement system is operable to propagate the at least one security label across task and/or sub-task boundaries to execute the workflow efficiently. In one embodiment, the agentic policy enforcement system is operable to enable task and/or sub-task inheritance. For example, a sub-task within a workflow is operable to inherit the at least one security label of a parent task and/or the at least one security label of the AI agent (i.e., subject) initiating the workflow. In one embodiment, the agentic policy enforcement system is operable to provide an override feature that manually or automatically prevents task and/or sub-task inheritance.

The agentic policy enforcement system is operable to include at least one task and/or sub-task delegated across components of an AI agent system. For example, the agentic policy enforcement system enables the at least one task and/or sub-task to be delegated from one AI agent to another AI agent within an AI agent system. While the another AI agent is operable to perform the task and/or sub-task within the context of the original task and/or sub-task, the another AI agent is limited to its own security label clearance. In some embodiments, the security label of one AI agent is operable to be delegated to another AI agent. However, the agentic policy enforcement system limits delegation of the at least one security label from a component with higher clearance/authorization to a component with equal or lower authorization.

To ensure compliance parameters, the agentic policy enforcement system includes delegation only within certain delegated label contexts. For example, an AI agent attempting to delegate a task and/or sub-task only discovers (i.e., has available to delegate) other AI agents that are authorized to complete the task and/or sub-task based on their own security labels. As such, the AI agent attempting to delegate the task and/or sub-task is only able to delegate the task and/or sub-task to authorized agents.

The agentic policy enforcement system is operable to include memory write policies, wherein memory segments within an AI agent system inherit at least one security label of a writing task unless the memory schema enforces a fixed classification. For example, a memory segment is generated by at least one AI agent. To generate the memory segment, the at least one AI agent uses data from a plurality of databases. In this example, the at least one AI agent has its own security label, and each of the plurality of databases has its own security label. To illustrate further, the memory segment includes data from a database with a maximum security clearance security label, data from a database with a medium security clearance security label, and the at least one AI agent that created the memory segment has a maximum security clearance security label. In one embodiment, the memory segment inherits the highest security label from the components that created the memory segment. In this example, the memory inherits the maximum security clearance label. In one embodiment, the at least one AI agent that creates the memory segment decides which security label the memory segment inherits. In this example, the at least one AI agent selects between maximum security clearance and medium security clearance. In one embodiment, the memory segment inherits the highest security label associated with a database from which the memory segment was created.

In one embodiment, the agentic policy enforcement system includes a label creation mechanism operable to generate, assign, propagate, and maintain security labels for every component and every system-generated artifact within an AI genetic workflow. The label creation mechanism ensures that all operational entities within the agentic policy enforcement system, including AI agents, tools, data sources, memory segments, intermediate outputs, tasks and/ or sub-tasks, and workflow contexts are initialized and maintained with at least one structured security label. Advantageously, this enables the REE to perform deterministic and context-aware authorization at every stage of task execution.

In one embodiment, the label creation mechanism generated derived labels for tasks, sub-tasks, and composite procedures that are created during workflow execution. When an AI agent initiates a task or sub-task, the task and/or sub-task inherits the security label of the initiating agent unless otherwise restricted by a policy or procedure-level label. When a composite task and/or sub-task is created within a procedure, the label creation mechanism assigns a procedure-level security label that is then propagated to each sub-task executed under that procedure. This enables consistent enforcement across multi-agent workflows and prevents unauthorized privilege escalation during delegation or escalation of tasks.

In one embodiment, the label creation mechanism assigns security labels to memory segments and system-generated artifacts created within the agentic policy enforcement system. When an AI agent writes a memory segment, the label creation mechanism drives the security label for the memory based at least in part on the security label of the writing agent, the security labels of any contributing data sources, and/or any schema-defined fixed classification rules associated with the memory type. In one embodiment, the memory segment inherits the highest data sensitivity or execution clearance among all contributing components and data sources. In another embodiment, the agentic policy enforcement system allows the writing agent to select from a constrained set of permissible labels, provided the selection does not violate any organizational policy enforced by the REE. In yet another embodiment, the memory always inherits the highest classification among contributing data sources regardless of the execution level of the agent. Advantageously, memory segments and derived data artifacts never exist without a security label, and the label travels with the data throughout subsequent reads, writes, and transformations.

The agentic policy enforcement system is operable to include escalation functionality of the at least one security label. For example, when a task and/or sub-task is escalated from one AI agent to another AI agent, the task and/or sub-task is assigned a lineage label reflecting both the escalation level and lineage of every previous AI agent that escalated the task and/or sub-task, preserving traceability. Advantageously, task inheritance, delegation, memory write policies, and escalation functionality prevent unauthorized privilege escalation, enforce a privilege of a component within an AI agent system relative to at least one policy, and ensure consistent policy application across dynamic, multi-agent workflows.

In one embodiment, as a non-limiting example, the agentic policy enforcement system is operable to detect a phishing scam. An organization is operable to include policies and procedures for the organization when a phishing scam is detected. In this example, an AI agent with the "T1_Investigator" role as part of at least one security label associated with the AI agent is operable to detect the phishing scam and initiate a phishing alert triage task and/or sub-task. As part of the phishing alert triage task and/or sub-task, the AI agent calls a third-party plugin (i.e., Virus-Total) to enrich a suspicious domain. The AI agent then delegates related domain correlation to a second AI agent with a "Threat_Intel" role. In the process of delegating the task and/or sub-task to the second AI agent, the AI agent writes the results from the third-party plugin to a shared memory between the AI agent and the second AI agent and tags the shared memory with a "confidential:T1" label. The second AI agent then escalates the task and/or sub-task to a third AI agent with an "IR_Agent" role, wherein the third AI agent operates under its own "restricted:T3" security label to execute the task and/or sub-task. Importantly, at each step in the process of detecting the phishing scam and completing the tasks and/or sub-tasks associated with terminating the phishing scam, an REE analyzes each action, object, and/or subject with security label validation and audit logging to ensure that no data is accessed or manipulated outside authorized boundaries set by the organization for each component within the AI agent system.

Referring now to the drawings in general, FIG. 1A is a schematic diagram of a runtime enforcement engine coordinating with an AI agent system (i.e., an AI agentic platform) according to one embodiment of the present invention. In this embodiment, an AI agentic platform is operable to include executable procedures. An executable procedure includes a series of tasks and/or sub-tasks executed in parallel and/or in series to respond to a prompt. For example, an executable procedure includes N number of tasks. As illustrated in FIG. 1A, Task 1 requires a first AI agent utilizing a tool. The first AI agent includes a security label such as "agent:T1_SOC_Analyst:low:T1," corresponding to the first AI agent's name, the operational role being "T1_SOC_Analyst," the data sensitivity being "low," and the clearance being T1.

In one embodiment, the AI agent system detects a cyberthreat. The first AI agent detects the cyberthreat and determines a series of tasks and/or sub-tasks in response to the cyberthreat. In one embodiment, the series of tasks and/or sub-tasks include other components within the AI agent system to complete.

Before executing the series of tasks and/or sub-tasks, the first AI agent is operable to query an REE, or alternatively, the REE is operable to intercept the first AI agent's action for policy enforcement approval before taking any action (i.e., performing the tasks and/or sub-tasks, delegating the tasks and/or sub-tasks, etc.). Each component executing the task and/or sub-task will receive approval from the REE before proceeding. For example, as illustrated in FIG. 1A, Task 1, Task 2, . . . . Task N will receive approval from the REE before executing the task and/or sub-task. Further, the arrows depicted in FIG. 1A represent queries and responses between the various components required for each task and/or sub-task and the REE, illustrated further in FIG. 1B.

In this embodiment, the first AI agent queries the REE by including all security labels for each component needed to execute the series of tasks and/or sub-tasks and which action the component will take. In this way, the first AI agent queries the REE for the entire series of tasks and/or sub-tasks for the REE to ensure that each of the series of tasks and/or sub-tasks are executed within a policy of an organization.

Figure 1B:
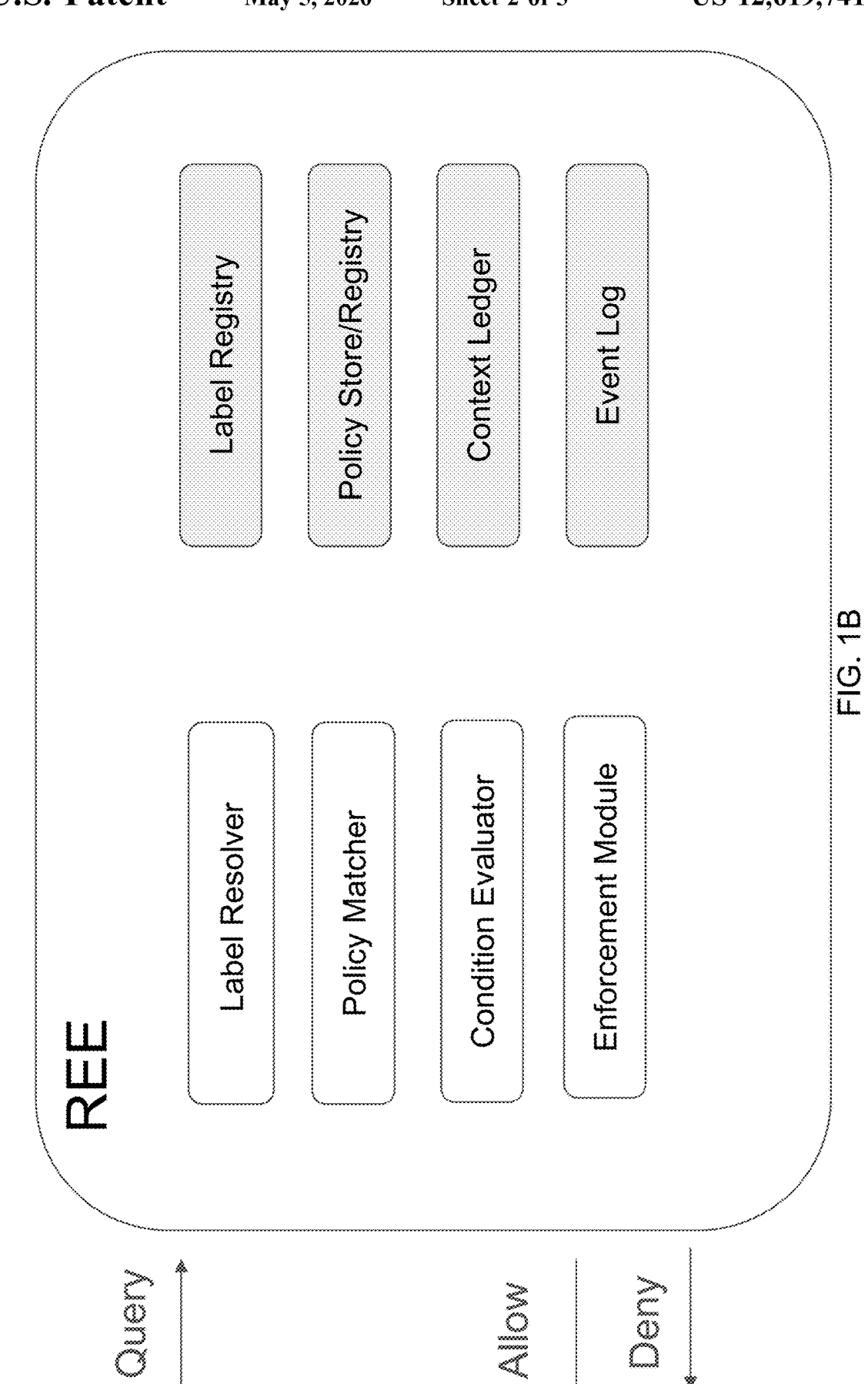
FIG. 1B illustrates a plurality of runtime enforcement engine capabilities according to one embodiment of the present invention.

FIG. 1B illustrates a plurality of runtime enforcement engine capabilities according to one embodiment of the present invention. Once the REE receives a query from a component necessary to execute the task and/or sub-task, the REE analyzes the security label. The REE utilizes a label resolver, a policy matcher, a condition evaluator, an enforcement module, a label registry, a policy store/registry, a context ledger, and an event log to allow, deny, or allow with audit a query to execute a task and/or sub-task.

The label resolver interprets and normalizes the security labels attached to each component. The label resolver parses labels defining role, clearance, data sensitivity, and operational context. In doing so, the label resolver resolves label inheritance conflicts (i.e., agent label against data label). To ensure consistency, the label resolver maintains a label registry for validation and lookup.

The policy matcher retrieves application policy rules from a store policy set and matches the policy rules against the security label that the REE is analyzing. The policy matcher uses domain-specific language (DSL) or a ruleset for matching to cross-reference the policy rules against the security label the REE is analyzing. The policy matcher is operable to filter policies by context (i.e., "SOC Tier 1 operations" or "Incident 1234"). In this way, the policy matcher identifies the set of policies applicable to the current procedure, task, sub-task, and/or event.

The condition evaluator determines whether the current query satisfies or violates policy conditions. The condition evaluator assesses conditions such as a component's role being "Tier 2" or data sensitivity versus clearance level based on the security label. The condition evaluator is able to consult historical decisions from a policy ledge to enforce stateful or cumulative rules. Further, the condition evaluator supports temporal logic (i.e., deny a query if the REE has overridden more than three denials in the past hour).

The enforcement module executes the decision of the REE. For example, the enforcement module executes an allow, deny, audit, or route decision. The enforcement module controls the query at the request level (blocking, redacting, or routing actions). The enforcement module is able to trigger remediation or "break-glass" workflows for authorized overrides. Further, the enforcement module communicates decisions back to the AI agentic platform with standard responses. In one embodiment, the standard responses include 200 ALLOW, 403 DENY, and/or any other standard response.

The event log records every decision by the REE with context for auditability. The event log writes each event with a timestamp, a component ID, an attempted action, a decision by the REE, and the rationale for the decision. The event log supports immutable audit trails and post-hoc policy analysis. In one embodiment, the event log feeds analytics back into the policy engine for continuous improvement.

The policy store/registry is a central repository for all policies and metadata. The policy store/registry stores both base and derived policies. In one embodiment, the policy store/registry is accessed by multiple REEs in a distributed mode.

The context ledger tracks linkage between sequential enforcement events. In this way, the context ledger acts as the memory of the REE. The context ledger associates actions with a context identifier (i.e., investigation, case ID, or workflow session). The contest ledger further enables stateful reevaluation and context-dependent decisions. The context ledger stores casual graph edges between actions.

As an example embodiment, the agentic AI platform tags a procedure run (i.e., execution) as ctx=ProcedureXYZ-<id>. Security labels travel with every procedure execution: actor_labels, object_labels, and any data_labels required to execute a task and/or sub-task as part of the procedure execution. Every request between the components and the REE is tuple-like, like <ctx, actor, action, object, labels>. In this example, Task 1 of the procedure execution is Agent T1_SOC_Analyst requesting to invoke Tool: VirusTotal (an external tool). The request is analyzed by the REE using the following security labels:actor-agent:T1_SOC_Analyst: low:T1, action=invoke_plugin, object=plugin:VirusTotal: external:T1, ctx=ProcedureXYZ. The label resolver parses and normalizes the labels. If Task 1 is working with alert data labeled data:int:T2, that label is included. The policy matcher loads rules for this context. As an example, the policy matcher of the REE is able to pull: Tier-1 agents may read internal sources. External calls require sanitized data or Tier-2 authorization. The condition evaluator checks conditions against the request and any prior events in the ctx procedure. In this example, Task 1 is the first task in the procedure, and as such, there are no prior events yet. In this example, the REE allows the request if the data is already sanitized or no sensitive fields are present, routes the data to a sanitizer if the sensitive internal data would leave the boundary, or denies the request and returns a reason for denial with a next step. The enforcement module returns the decision to the AI agentic platform. If the request is routed, the AI agentic platform calls the approved sanitizer tool, then repeats step 1 with updated data labels such as sanitized: true. The event log writes ALLOW or ROUTE/DENY with ctx, inputs, and rationale.

Continuing the example embodiment above, Task 2 of the ctx=ProcedureXYZ-<id> includes Agent Threat_Intel_Analyst (confidential:T3) requesting read on Tool: Intel_Reports (internal). The request is as follows: actor=agent:Threat_Intel_Analyst:confidential:T3, action=read, object=datasource: Intel_Reports:internal:T1, ctx=ProcedureXYZ. The REE analyzes the request using the label resolver. The label resolver merges the labels. If Task 2 consumes output from Task 1 (i.e., is task dependent), the REE uses propagated data labels like sanitized: true or confidential:T3. The policy matcher loads rules such as: Tier-3 analysts may access the internal intel report. However, external transmission still requires sanitization or explicit approval. The condition evaluator considers the history in the same ctx procedure from Task 1. As an example, if an external call already occurred, a rule requires audit or manager review for further egress. The REE decides to allow the request if the request is an internal read by T: with audit:true. If Task 2 later tried to push findings to an external API, the REE will either allow if sanitized: true, route to sanitizer, require override, or deny. The event log appends the decision with the same ctx, creating a linked trail of Task 1 and Task 2 outcomes.

In this example, the requests, decisions, and security labels are operable to be linked and propagated. For example, because both Task 1 and Task 2 use the same ctx, the REE can apply temporal policies like rate limits, "only one external egress per investigation," or "escalate three denials." The AI agentic platform is also operable to propagate labels, such as when outputs from each allowed action inherit or union labels (i.e., internal: T2 plus sanitized:true. These labels travel to the next procedure call (i.e., execution) so the REE is able to make consistent decisions without guessing at data lineage. When ctx procedure XYZ is complete, the REE returns a summary for ctx that lists allows, denies, routes, overrides, and the effective label lineage. The summary becomes the audit artifact.

In one embodiment, the agentic policy enforcement system is operable to include a break-glass override. In this embodiment, the REE is operable to receive a request to override such that the REE enables bypassing policy enforcement in emergency cases. The REE must receive an input for justification as to why the override is necessary, and the REE is operable to conduct an audit during the bypass period.

In one embodiment, the agentic policy enforcement system is operable to include a policy simulation mode. In this embodiment, the agentic policy enforcement system is operable to enable administrators to simulate policy enforcement within an AI agentic system before the agentic policy enforcement system is deployed. This enables administrators to test the functionality of a policy and associated security labels before implementing the policy. Importantly, in this embodiment, AI agent memory is reset after the simulation is complete such that the AI agents, and all associated components, delete any saved data obtained during the simulation.

In one embodiment, the agentic policy enforcement system is operable to include integration with RBAC and/or Attribute-Based Access Control (ABAC). In this embodiment, the agentic policy enforcement system is operable to layer on top of traditional identity-based controls such that security labels are added to each component instead of being a native part of every component.

In one embodiment, the agentic policy enforcement system supports tasks and/or sub-tasks in a plurality of ways. For example, the agentic policy enforcement system is operable to support saved tasks and/or sub-tasks. To illustrate further, an AI agent system is operable to save a series of tasks and/or sub-tasks as a procedure, wherein the AI agent system and components within the AI agent system are operable to call the procedure to execute a function. As such, the agentic policy enforcement system is operable to support procedure-based AI agent systems, wherein the components within the AI agent system include at least one security label, and wherein the agentic policy enforcement system is operable to adapt to various inputs, participants, or organizational configurations without damaging the procedure run. The agentic policy enforcement system enables AI agent systems, particularly in the cybersecurity domain, to operate autonomously while remaining within enforceable, transparent, and auditable policy constraints. The agentic policy enforcement system is operable to extend the applicability of traditional prior art systems to dynamic, procedural, and multi-AI agent systems.

In one embodiment, the REE is operable to cache previous "allow" decisions for frequent lookups (Time to Live-bound) to reduce latency in the decision-making process.

In one embodiment, the agentic policy enforcement system is operable to enable a rollback function to undo upgrades, policy changes, security label assignments, and/or any other changes in the agentic policy enforcement system from one version to another. In one embodiment, the agentic policy enforcement system is operable to utilize staged deployment for policy changes such that the entire policy is not implemented at the same time.

In one embodiment, the REE is operable to temporarily allow actions and log what would have happened if that action was denied, enabling the REE to fine-tune itself to become more efficient and more effective in enforcing a policy.

In one embodiment, the agentic policy enforcement system includes the AI agents within an AI agent system operable to pass down context and security clearance. For example, a low-clearance AI agent executing a task and/or sub-task on behalf of a high-clearance AI agent is able to inherit the security clearance of the high-clearance AI agent. However, the agentic policy enforcement system does not allow the low-clearance agent to escalate a task and/or sub-task to the high-clearance agent as a way to perform the task and/or sub-task the low-clearance agent is not authorized to perform.

The agentic policy enforcement system includes at least one memory. In one embodiment, the at least one memory is operable to include memory cells and data blobs. The memory cells and data blobs retain their original security label because the security labels follow the data, not the agent that wrote it. While AI agents retain a security label for authorization, the security label for the data is what the security label for the AI agent is cross-referenced against. In one embodiment, the at least one memory is created using a plurality of components within the AI agent system (i.e., multiple AI agents completing a procedure accessing multiple databases). In this embodiment, the at least one memory will inherit the highest level security label associated with a particular component of the plurality of components that were used to create the memory (i.e., create the data). Notably, however, the privileges of the plurality of components acting to collectively execute an action retain the security label of the lowest clearance component of the plurality of components. Therefore, while the privileges of the plurality of components are low, new memories and/or data created by the collective action includes the highest security label clearance.

In one embodiment, new memory segments and/or data artifacts are automatically assigned security labels derived from a label of the agent that wrote the memory segment, the security labels of data sources that contributed to the creation of the memory segment, schema-defined fixed labels, or selectable labels within allowed constraints. Importantly, the data retains labels across reads, writes, and transformations, ensuring that newly created memory segments and/or data artifacts maintain or elevate sensitivity based on source data.

In one embodiment, the agentic policy enforcement system is operable to utilize wildcards in at least one security label. For example, a "*" symbol acts as a wildcard such that the "*" as any portion of a security label enables the component access to all levels of clearance where the "*" is located. This enables variable security clearance during role execution.

Figure 2:
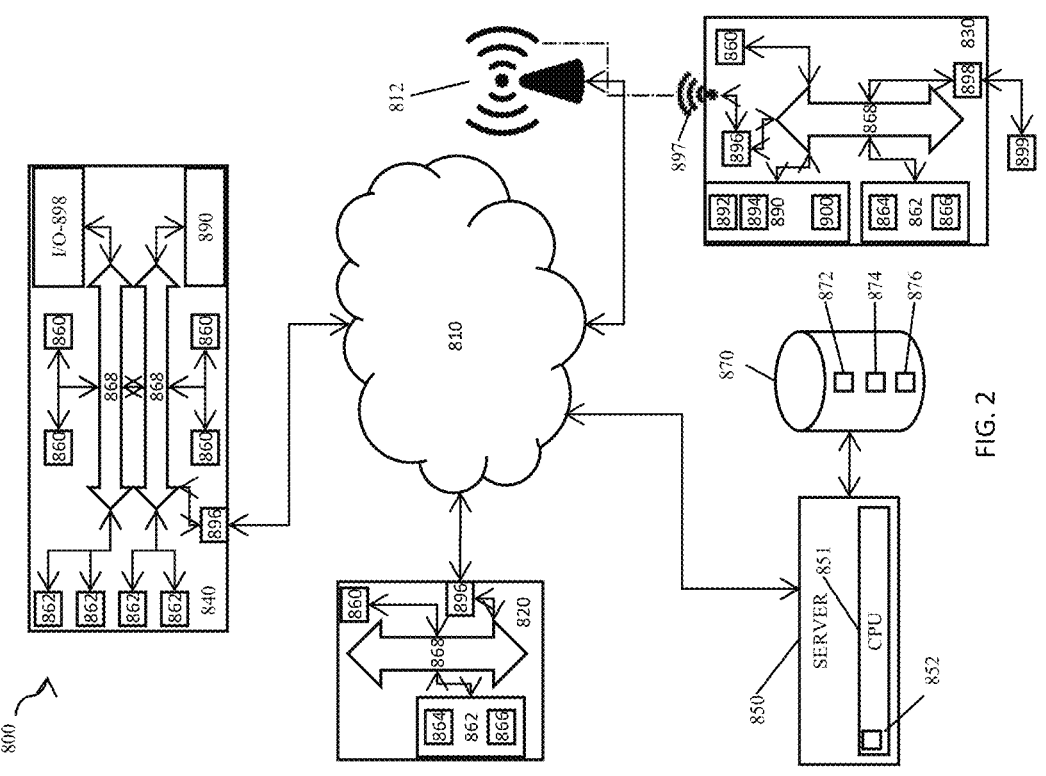
FIG. 2 illustrates a schematic diagram according to one embodiment of the present invention.

FIG. 2 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 2, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

It is also contemplated that the computer system 800 is operable to not include all of the components shown in FIG. 2, is operable to include other components that are not explicitly shown in FIG. 2, or is operable to utilize an architecture completely different than that shown in FIG. 2. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A method for enforcing policy controls in an AI agent workflow, comprising:
  providing a computer processor including a memory;
  providing at least one security label for components of the AI agent workflow;
  wherein the components of the AI agent workflow include at least one AI agent, at least one tool, at least one data source, and at least one memory;
  intercepting via a run-time enforcement engine a request by a requesting component of the AI agent workflow to perform an action on a target component;
  retrieving a security label associated with the requesting component and a security label associated with the target component;
  matching the security label associated with the requesting component against a set of predefined policy rules, wherein each rule of the set of predefined policy rules specifies permitted or restricted actions based on security label attributes;
  evaluating a contextual condition associated with the requesting component;

determining, based on the set of predefined policy rules and the evaluated contextual condition, whether to allow, deny, or conditionally permit the request; and
  executing, blocking, or auditing the action based on the determination.

2. The method of claim 1, wherein the at least one security label includes an identity field, a function role field, a data sensitivity classification, and an execution level designation.

3. The method of claim 1, wherein the action includes reading from a memory element, writing to the memory element, invoking a plugin and/or external service, delegating a task and/or sub-task from a first of the at least one AI agent to a second of the at least one AI agent, escalating the task and/or sub-task to a higher level AI agent, and/or executing a procedure.

4. The method of claim 1, further comprising generating an audit log for each intercepted request, wherein the audit log includes a subject label, an object label, an action attempted, a decision result, and a timestamp.

5. The method of claim 1, wherein the set of predefined policy rules includes wildcard or pattern-based matching for the at least one security label and wherein the contextual condition includes evaluating dynamic run-time attributes, including time of day, case assignment, agent team membership, and/or task lineage.

6. The method of claim 1, wherein the at least one AI agent includes a tier 1 alert triage agent, a threat intelligence enrichment agent, a vulnerability management agent, and/or an incident response reporting agent.

7. The method of claim 1, wherein the action includes execution of a predefined security operations center (SOC) procedure, wherein the SOC procedure includes a phishing alert triage, a ransomware incident response, executive summary reporting, and/or vulnerability remediation planning.

8. A method for enforcing policy controls in an AI agent workflow, comprising:
  providing a computer processor including a memory;
  including a procedure within the AI agent workflow;
  providing a plurality of components within the AI agent workflow;
  assigning a procedure-level security label to a composite task within the AI agent workflow;
  wherein the plurality of components of the AI agent workflow includes at least one AI agent, at least one tool, at least one data source, and at least one memory;
  wherein the composite task includes at least one sub-task;
  propagating the procedure-level security label to the at least one sub-task within the procedure executed by one of the plurality of components within the AI agent workflow;
  enforcing at least one policy authorization by a run-time enforcement engine execution of the at least one sub-task under the propagated procedure-level security label;
  maintaining an association between each of the at least one sub-task and the one of the plurality of components calling the at least one sub-task; and
  auditing the at least one sub-task executed by the one of the plurality of components within the AI agent workflow under the propagated procedure-level security label.

9. The method of claim 8, further comprising limiting propagated actions within the composite task based on a native label of an executing AI agent to prevent unauthorized privilege escalation.

10. The method of claim 8, wherein the run-time enforcement engine includes predefined security operating center (SOC) rulesets for escalation of alerts based on label elevation logic, enforcement of sensitivity containment across reporting procedures, and/or dynamic enrichment permissions based on data sensitivity and source trust levels.

11. The method of claim 8, wherein the procedure includes a series of tasks and/or sub-tasks operable to be executed by any of the at least one AI agent within the AI agentic workflow.

12. The method of claim 8, wherein the procedure-level security label includes an identity, a function role, a data sensitivity classification, and an execution level.

13. The method of claim 8, further comprising a temporary override function such that the run-time enforcement engine allows the at least one sub-task until the temporary override is terminated.

14. A system for enforcing policy controls in an AI agent workflow, comprising:

at least one computer processor including a memory;

a plurality of AI agents each configured to perform tasks and/or sub-tasks in a collaborative workflow;

a security label registry associating security labels with components within the AI agent workflow;

a policy engine operable to store and match policy rules based on the security labels;

a run-time enforcement engine operable to intercept an attempted action, resolve security labels associated with requesting components and security labels associated with target components, evaluate the policy rules and contextual conditions, and return a decision to allow, deny, or audit allowed actions;

wherein the components within the AI agent workflow include the plurality of AI agents, at least one tool, at least one memory, and at least one data source; and wherein the at least one memory is operable to store the tasks and/or sub-tasks, results for completed tasks and/or sub-tasks, and a shared memory state.

15. The system of claim 14, wherein the run-time enforcement engine is operable to support a break-glass override function, a policy versioning rollback, and a simulated policy enforcement for policy validation.

16. The system of claim 14, wherein the plurality of AI agents operate asynchronously and across different execution levels, and wherein the run-time enforcement engine ensures consistent policy enforcement across distributed execution contexts.

17. The system of claim 14, wherein the run-time enforcement engine is operable to log each of the intercepted attempted actions.

18. The system of claim 14, wherein the at least one memory includes saving a series of tasks and/or sub-tasks as a procedure.

19. The system of claim 14, wherein the security labels include an identity, a function role, a data sensitivity classification, and an execution level.

20. The system of claim 14, wherein resolving the security labels includes the run-time enforcement engine comparing a subject type, role match, sensitivity match, and level match to an object type, object role match, object sensitivity match, and an object level match.

* * * * *